United States Patent [19]

Minke et al.

[11] Patent Number: 5,759,473
[45] Date of Patent: Jun. 2, 1998

[54] PROCESS FOR PRODUCING AN EMBOSSING ROLL CONTINUOUSLY EMBOSSING THE SURFACE OF A THERMOPLASTIC FILM

[75] Inventors: Jürgen Minke, Langenhagen; Günter Vogt, Garbsen, both of Germany

[73] Assignee: Firma Benecke-Kaliko Aktiengeselltschaft, Hannover, Germany

[21] Appl. No.: 542,084

[22] Filed: Oct. 12, 1995

[30] Foreign Application Priority Data

Nov. 19, 1994 [DE] Germany .................. 44 41 216.9

[51] Int. Cl.$^6$ .................... B23K 26/02; B23K 26/08
[52] U.S. Cl. ............... 264/400; 219/121.61; 219/121.68; 219/121.69; 264/219; 264/284; 425/174.4
[58] Field of Search .................... 264/400, 482, 264/219, 284; 219/121.6, 121.61, 121.67, 121.68, 121.69; 425/385

[56] References Cited

U.S. PATENT DOCUMENTS

| | | | |
|---|---|---|---|
| 3,549,733 | 12/1970 | Caddell | 264/400 |
| 4,634,484 | 1/1987 | Wagner | 264/219 |
| 4,664,058 | 5/1987 | Schroeder et al. | |
| 4,744,936 | 5/1988 | Bittner, Jr. | 264/284 |
| 4,832,966 | 5/1989 | Newsteder | 264/219 |
| 5,003,153 | 3/1991 | Kondo | 219/121.68 |
| 5,269,983 | 12/1993 | Schulz | 264/400 |
| 5,296,184 | 3/1994 | Wu et al. | 264/284 |
| 5,338,915 | 8/1994 | Hildebrand et al. | 219/121.61 |

FOREIGN PATENT DOCUMENTS 55-42878  3/1980  Japan .................. 264/400

*Primary Examiner*—Mathieu D. Vargot
*Attorney, Agent, or Firm*—Olson & Hierl, Ltd.

[57] ABSTRACT

Process for producing a silicone coated embossing roll for continuously embossing the surface of thermoplastic film. A laser beam is used to cut into the smooth silicone rubber surface of the roll, a pattern or design which replicates a negative of a leather grain, for example. The intensity of the laser beam and its movement is controlled by a signal generated by scanning the original leather grain. This process permits a simple and inexpensive way to produce an embossed structure in the silicone surface of an embossing roll, even when the structure to be repeated is extremely fine. No tedious manual steps are necessary to achieve the most natural possible reproduction in embossing.

4 Claims, No Drawings

PROCESS FOR PRODUCING AN EMBOSSING ROLL CONTINUOUSLY EMBOSSING THE SURFACE OF A THERMOPLASTIC FILM

BACKGROUND OF THE INVENTION

This invention concerns a process for producing an embossing roll for continuously embossing the surface of a thermoplastic film.

THE PRIOR ART

German patent 3,405,985 C2 discloses a process of this type where the surface structure has a grain. A synthetic resin is applied by casting or coating as a uniformly thick layer on the surface of a grain original having the desired grain and then is cured or cross-linked to form the embossing master, which is then pulled away and applied to the circumferential surface of the embossing roll. Normally this would result in a butt joint between the edges of the embossing master that abut against each other in the circumferential direction, so such an embossing roll would not yield a continuous grain.

In order to overcome this disadvantage, the above-mentioned patent discloses a method of performing certain intermediate steps by first embossing the surface of a thermoplastic film with the embossing master under heat and pressure and then bringing the opposite edges together after embossing to form a tube. A butt joint is again unavoidable with these edges, but according to the teaching of this known publication, this butt joint is eliminated by embossing the thermoplastic film with the embossing master once again in the area of the abutting edges while applying heat and pressure so as to thus create a continuous positive impression. A layer of silicone rubber is applied to the thermoplastic film by casting or coating and is cured to form an embossed copy which is pulled off the positive mold and is glued to the circumferential surface of the embossing roll with the negative embossing surface facing outward. The result of this known process is an embossing roll with a silicone surface that does not have a butt joint.

This known process thus leads to the desired result of a silicone embossing roll with a continuous surface structure, but a significant disadvantage of this known process is the great effort required to carry out the intermediate steps in order to create the continuous surface structure.

German patent 4,213,106 A1 discloses a process for machining the surfaces of workpieces, where the beam of a laser beam source is directed by a suitable device at the surface to be machined, and the beam is controlled individually in accordance with the intended geometry of the workpiece surface to be produced. This method should yield cutting results in the material for the purpose of producing the desired three-dimensional geometry of the workpiece. The object of this process is to produce a numerically controlled and variable mask by machining, performed layer by layer in the form of surface structuring in the manner of a given three-dimensional pattern. An example from the state of the art is the production of master rolls for embossing operations where the continuous structure must be seamless, which requires labor-intensive and therefore wage-intensive afterworking of the product given the known casting technology and the butt joints associated with it. These known master rolls are metal rolls in the surface of which only relatively simple and consistent embossed structures can be created. Metal rolls produced by this known method are not suitable for embossing fine structures, such as those copied from natural leather surfaces.

SUMMARY OF THE INVENTION

The object of this invention is to provide a process for producing an embossing roll for continuously embossing the surface of a thermoplastic film, that is simple and inexpensive to carry out and makes possible the production of an embossing roll with which even very fine surface structures can be embossed, such as those corresponding to natural leather originals, for example.

The object of this invention is achieved by the teaching in the following disclosure.

This invention is based on the concept of producing the embossing structure in the embossing surface of an embossing roll made of silicone rubber directly by machining with a laser beam. The laser beam source is moved in a predetermined manner dictated by the surface structure of a patterned original to remove specific portions of the silicone rubber. It is surprising that a master embossing roll produced by the method according to this invention would have such a high fidelity to the original, especially with very fine surface structures or configurations.

Another advantage of this invention is that the embossing surface of the embossing roll is produced directly without any intermediate steps. This means that a great deal of time is saved in comparison with the process described initially where the production and machining of the individual layers take several days, followed by the curing and cross-linking times for the materials and adhesives that are applied in liquid form before the rolls can be used for embossing. On the whole, these process steps usually take more than 14 days. In addition, two roll bodies are required. All of this is avoided with the present process.

Since a silicone embossing roll can be produced in a very short period of time by the process according to this invention, embossing rolls with different surface structures can also be produced in a short period of time. This permits rapid adjustment to customer requests, especially for smaller orders.

SPECIFIC EXAMPLES

Example: First a layer of silicone rubber with a smooth circumferential surface is applied to a steel roll. The roll is rotated while a laser beam is guided over the peripheral surface parallel to the axis of rotation of the roll in such a way that essentially the entire peripheral surface is treated. During this movement of the laser beam relative to the surface of the roll, the intensity of the laser beam is controlled as a function of a control signal obtained by scanning the surface of a patterned original. The surface may be scanned optically or mechanically, and an electric signal is generated in accordance with the scanning results and is used directly to control the position and intensity of the laser. One alternative consists of temporarily storing the electric signal obtained by scanning the patterned original and processing it in such a way that butt joints are avoided. The result is then a surface structure in the silicone rubber outside surface of the embossing roll that does not have any butt joints or abrupt transitions.

We claim:

1. Process for producing an embossing roll for continuously embossing the surface of thermoplastic film, the embossing surface of which is a negative of a surface structure to be embossed, comprising providing a roll having a smooth silicone rubber layer on the circumferential surface thereof, providing a surface structure of a patterned design which is to be reproduced by embossing on the surface of said thermoplastic film, directing a laser beam at the surface of said silicone rubber layer while moving said laser beam and the circumferential surface of said silicone rubber layer, and controlling the position and intensity of said laser beam in response to the surface structure in the pattern of said patterned design, thereby producing a negative of said surface structure on the surface of said silicone rubber layer.

2. Process of claim 1 in which said roll is rotated while said laser beam is moved parallel to the axis of said roll.

3. Process of claim 2 in which the position and intensity of said laser beam is dictated by a signal generated by optically scanning said surface structure pattern.

4. Process of claim 2 in which the position and intensity of said laser beam is dictated by a signal generated by mechanically scanning said surface structure pattern.

* * * * *